US012651965B2

(12) United States Patent
Chuang et al.

(10) Patent No.: US 12,651,965 B2
(45) Date of Patent: Jun. 9, 2026

(54) ADAPTIVE POWER SYSTEM

(71) Applicant: Himax Technologies Limited, Tainan City (TW)

(72) Inventors: Tsung-Lin Chuang, Tainan City (TW); Chuan-Chien Hsu, Tainan City (TW)

(73) Assignee: Himax Technologies Limited, Tainan City (TW)

( * ) Notice: Subject to any disclaimer, the term of this patent is extended or adjusted under 35 U.S.C. 154(b) by 170 days.

(21) Appl. No.: 18/817,072

(22) Filed: Aug. 27, 2024

(65) Prior Publication Data

US 2026/0066781 A1 Mar. 5, 2026

(51) Int. Cl.
*H02M 3/06* (2006.01)
*H02M 1/00* (2006.01)
*H02M 3/00* (2006.01)

(52) U.S. Cl.
CPC ........... *H02M 3/06* (2013.01); *H02M 1/0025* (2021.05); *H02M 1/0041* (2021.05); *H02M 1/009* (2021.05); *H02M 3/003* (2021.05)

(58) Field of Classification Search
CPC ...... H02M 3/06; H02M 1/009; H02M 1/0025; H02M 3/003
See application file for complete search history.

(56) References Cited

U.S. PATENT DOCUMENTS

| 2009/0102449 | A1* | 4/2009 | Chang | H02M 3/1582 |
| | | | | 323/311 |
| 2015/0200598 | A1* | 7/2015 | Kha | H02M 3/33523 |
| | | | | 363/17 |
| 2022/0103065 | A1* | 3/2022 | Puggelli | H02M 1/36 |
| 2023/0402911 | A1* | 12/2023 | Akatsuki | H02M 1/0025 |

* cited by examiner

*Primary Examiner* — Rafael O De Leon Domenech
(74) *Attorney, Agent, or Firm* — Donald E. Stout; Stout, Uxa & Buyan, LLP

(57) ABSTRACT

An adaptive power system includes a multi-output reference voltage generator that generates multiple reference voltages; a low-voltage detector that detects a supply voltage and accordingly generates a power detect signal representing relationship between the supply voltage and at least one predetermined threshold; a selector that selects one of the multiple reference voltages according to the power detect signal, thereby outputting a selected reference voltage; a boost control circuit that generates a control signal according to the selected reference voltage; and a boost converter that generates power voltages according to the control signal.

17 Claims, 3 Drawing Sheets

100

ADAPTIVE POWER SYSTEM

BACKGROUND OF THE INVENTION

1. Field of the Invention

The present invention generally relates to a display system, and more particularly to an adaptive power system capable of adaptively generating power voltages according to change in a supply voltage.

2. Description of Related Art

A boost converter is a DC-to-DC power converter used to enhance an input voltage. The boost converter is widely used in a display system such as liquid-crystal display (LCD) to provide required power voltages (e.g., gate high voltage VGH and gate low voltage VGL) for a driver.

In the realm of boost converters, the relationship between supply voltage VDD and power voltages VGH and VGL is pivotal. When the supply voltage VDD falls below a threshold (e.g., 2.5 volts), a significant voltage drop in the power voltages VGH and VGL is observed due to the increased voltage amplification factor. This is because the boost converter, designed to multiply the input voltage to a higher level, has a set gain that becomes disproportionately high when the supply voltage decreases. For instance, at a supply voltage VDD of 3 volts, achieving a VGH of 20 volts requires an amplification factor of 6.67 times. However, if the supply voltage VDD decreases to below 2.5 volts, say 2.2 volts, the amplification factor must increase to 9.1 times to maintain the same VGH level. This increased gain can lead to inefficiencies and instability in the boost converter's performance.

Conversely, when the supply voltage VDD is increased back to 3 volts, maintaining the same boost driving strength as when VDD was below 2.5 volts can lead to an overdrive situation. The boost converter, now receiving a higher input voltage, would still attempt to amplify it by the same factor, resulting in a VGH that exceeds the desired 20 volts. This can cause issues such as excessive peak currents and potential damage to the converter or the load it is driving. It is crucial for the boost converter's control system to adjust the driving strength according to the varying supply voltage to prevent such problems. This involves a dynamic mechanism that can respond to the supply voltage changes and modulate the boost converter's operation accordingly.

Understanding the intricacies of boost converter operation is essential for designing robust power supply systems that can handle a range of input voltages without compromising on output voltage stability or efficiency. Engineers must carefully consider these factors when designing circuits that require stable high voltages from lower voltage sources. The key is to ensure that the boost converter can adapt its amplification factor dynamically to the changing input conditions, thus maintaining a consistent output voltage and preventing any undue stress on the system. This highlights the importance of intelligent circuit design and the need for advanced control schemes that can manage these variations in real-time, ensuring the longevity and reliability of electronic devices.

SUMMARY OF THE INVENTION

In view of the foregoing, it is an object of the embodiment of the present invention to provide an adaptive power system capable of adaptively generating power voltages according to change in a supply voltage by switching among multiple reference voltages and/or multiple clock signals.

According to one embodiment, an adaptive power system includes a multi-output reference voltage generator, a low-voltage detector, a selector, a boost control circuit and a boost converter. The multi-output reference voltage generator generates multiple reference voltages. The low-voltage detector detects a supply voltage and accordingly generates a power detect signal representing relationship between the supply voltage and at least one predetermined threshold. The selector selects one of the multiple reference voltages according to the power detect signal, thereby outputting a selected reference voltage. The boost control circuit generates a control signal according to the selected reference voltage. The boost converter generates power voltages according to the control signal.

DETAILED DESCRIPTION OF THE INVENTION

Figure 1:
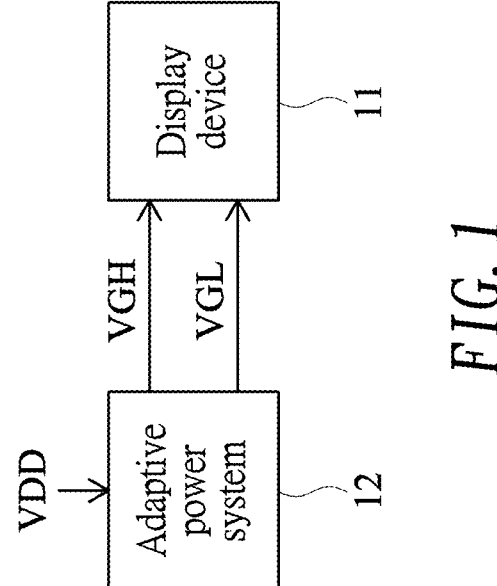
FIG. 1 shows a block diagram illustrating a display system according to one embodiment of the present invention.

FIG. 1 shows a block diagram illustrating a display system 100 according to one embodiment of the present invention.

In the embodiment, the display system 100 may include a display device 11, such as liquid-crystal display (LCD). The display system 100 may include an adaptive power system 12 adaptable to the display device 11 and configured to generate power voltages, such as a gate high voltage VGH and a gate low voltage VGL, for controlling (a gate driver of) the display device 11. According to one aspect of the embodiment, the adaptive power system 12 is capable of adaptively generating the power voltages (e.g., the gate high voltage VGH and the gate low voltage VGL) according to change in a supply voltage VDD, where the gate high voltage VGH (usually a positive voltage) is greater than the gate low voltage VGL (usually a negative voltage).

Figure 2:
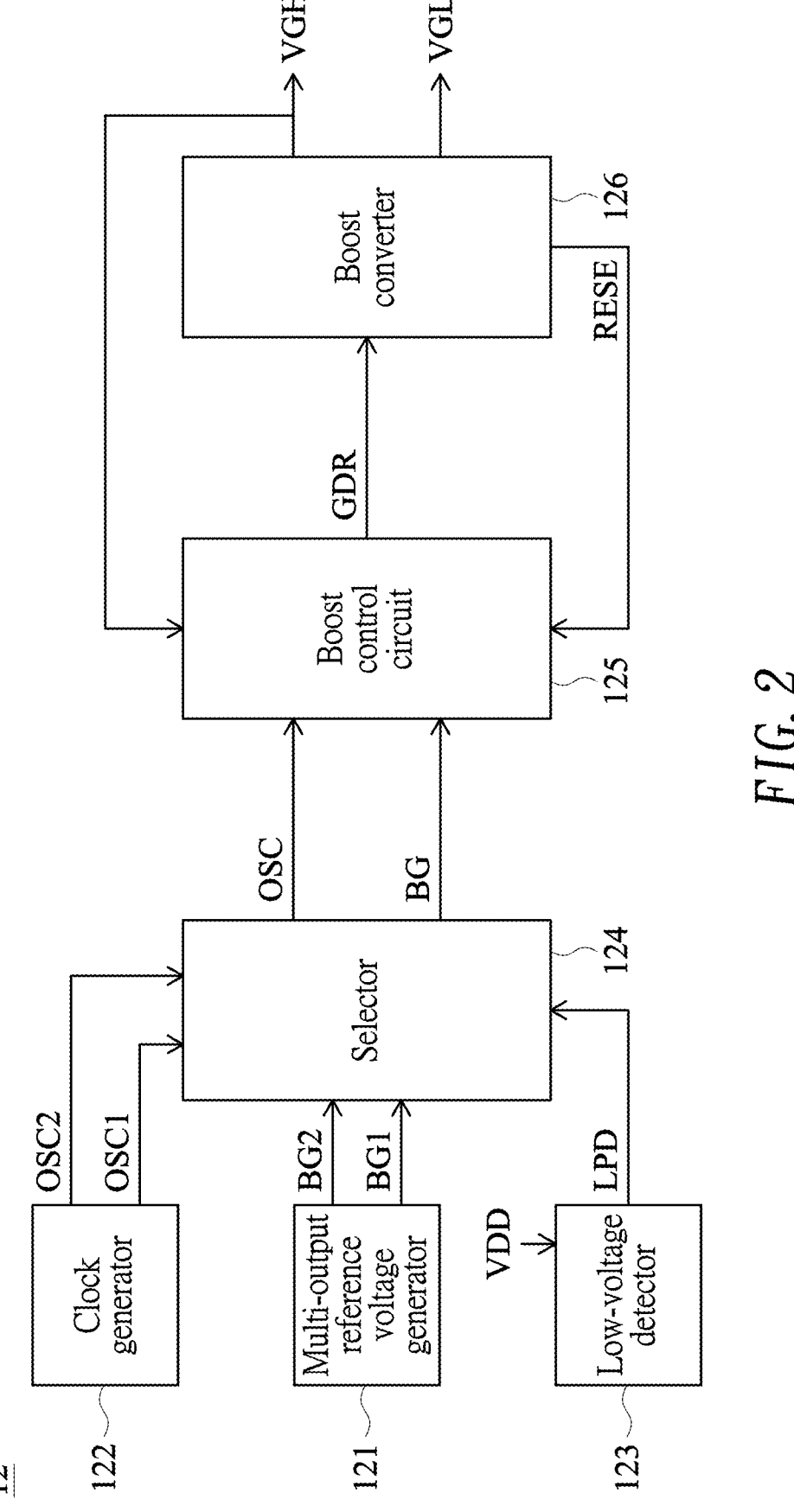
FIG. 2 shows a detailed block diagram of the adaptive power system of FIG. 1 according to one embodiment of the present invention.
Figure 3:
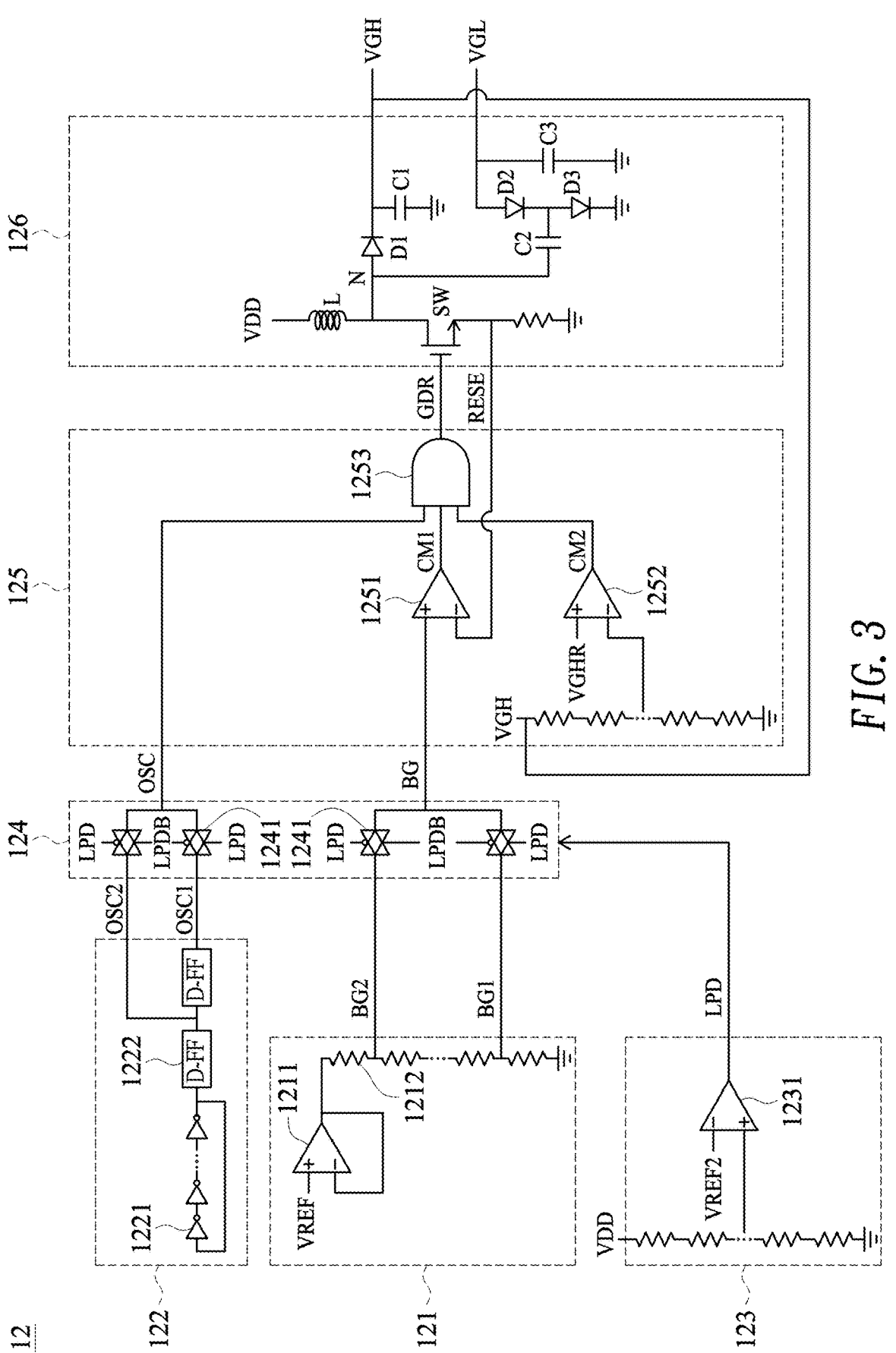
FIG. 3 shows a circuit diagram of the adaptive power system of FIG. 2.

FIG. 2 shows a detailed block diagram of the adaptive power system 12 of FIG. 1 according to one embodiment of the present invention, and FIG. 3 shows a circuit diagram of the adaptive power system 12 of FIG. 2.

Generally speaking, the adaptive power system 12 may include a multi-output reference voltage generator 121 (e.g., bandgap voltage reference circuit) configured to generate multiple reference voltages. In the embodiment, the multi-output reference voltage generator 121 may include a dual-output reference voltage generator configured to generate a first reference voltage BG1 and a second reference voltage BG2, where BG2 is greater than BG1 in voltage.

As exemplified in FIG. 3, the multi-output reference voltage generator 121 may include an operational amplifier 1211 coupled to receive a base reference voltage VREF and configured as a unit-gain buffer to generate a buffered voltage; and include a plurality of resistors 1212 connected in series between the buffered voltage and ground to configure as a voltage divider, from which multiple divided voltages (e.g., BG1 and BG2) are outputted as the reference voltages respectively.

Generally speaking, the adaptive power system 12 may include a clock generator 122 configured to generate multiple clock signals. In the embodiment, the clock generator 122 may generate a first clock signal OSC1 and a second clock signal OSC2, where OSC2 is greater than OSC1 in frequency.

As exemplified in FIG. 3, the clock generator 122 may include an odd number of inverters 1221 connected in a loop to configured as a ring oscillator; and include a plurality of flip-flops 1222 (e.g., D-type flip-flops or D-FFs) connected in series to an output of the ring oscillator and used as frequency dividers, from which multiple signals (e.g., OSC1 and OSC2) with different frequencies are outputted as the clock signals respectively.

Generally speaking, the adaptive power system 12 may include a low-voltage detector 123 configured to detect the supply voltage VDD and accordingly generate a power detect signal representing relationship between the supply voltage VDD and at least one predetermined threshold. In the embodiment, the low-voltage detector 123 generates a low power detect (LPD) signal which becomes active (e.g., "1") when the supply voltage VDD is greater than a predetermined threshold (e.g., 2.5V), otherwise the LPD signal becomes inactive (e.g., "0") when the supply voltage VDD is not greater than the predetermined threshold.

As exemplified in FIG. 3, the low-voltage detector 123 may include a comparator 1231 configured to compare a predetermined faction of the supply voltage VDD with a predetermined threshold VREF2. The low power detect (LPD) signal becomes active (e.g., "1") when the predetermined fraction of the supply voltage VDD is greater than the predetermined threshold VREF2, otherwise the LPD signal becomes inactive (e.g., "0").

Generally speaking, the adaptive power system 12 may include a selector 124 (e.g., a multiplexer) configured to select one of the multiple reference voltages (e.g., the first reference voltage BG1 and the second reference voltage BG2) from the multi-output reference voltage generator 121 according to the power detect signal (e.g., LPD) from the low-voltage detector 123, thereby outputting a selected reference voltage BG. The selector 124 of the embodiment may further select one of the multiple clock signals (e.g., the first clock signal OSC1 and the second clock signal OSC2) from the clock generator 122 according to the power detect signal (e.g., LPD) from the low-voltage detector 123, thereby outputting a selected clock signal OSC.

As exemplified in FIG. 3, the selector 124 may include a plurality of switches 1241 controlled by the LPD signal and an inverted LPD signal. The selector 124 selects the second reference voltage BG2 when the LPD signal is inactive (when the supply voltage VDD is not greater than a predetermined threshold), otherwise selects the first reference voltage BG1 when the LPD signal is active (when the supply voltage VDD is greater than the predetermined threshold). Moreover, the selector 124 selects the first clock signal OSC1 when the LPD signal is active (when the supply voltage VDD is greater than a predetermined threshold), otherwise selects the second clock signal OSC2 when the LPD signal is inactive (when the supply voltage VDD is not greater than the predetermined threshold).

In the embodiment, the adaptive power system 12 may include a boost control circuit 125 coupled to receive the selected reference voltage BG and the selected clock signal OSC, and configured to accordingly generate a control signal GDR. The adaptive power system 12 of the embodiment may include a boost converter 126 coupled to receive the control signal GDR and configured to accordingly generate the power voltages (e.g., the gate high voltage VGH and the gate low voltage VGL). In one embodiment, the control signal GDR may be generated further according to a detect voltage RESE derived from the boost converter 126.

As exemplified in FIG. 3, the boost control circuit 125 may include a first comparator 1251 configured to compare the selected reference voltage BG and the detect voltage RESE, thereby generating an active first compare result (e.g., "1") CM1 when the selected reference voltage BG is greater than the detect voltage RESE. The boost control circuit 125 may include a second comparator 1252 configured to compare a predetermined fraction of one power voltage (e.g., VGH) with a predetermined value VGHR, thereby generating an active second compare result (e.g., "1") CM2 when the predetermined fraction of the power voltage is less than the predetermined value VGHR. The boost control circuit 125 may include a logic circuit, such as an AND gate 1253, coupled to receive the first compare result CM1 of the first comparator 1251, the selected clock signal OSC and the second compare result CM2 of the second comparator 1252. Accordingly, the control signal GDR becomes active (e.g., "1") only if all the first compare result CM1, the selected clock signal OSC and the second compare result CM2 are active.

As further exemplified in FIG. 3, the boost converter 126 may primarily include an inductor L, a switch SW, a first diode D1, a second diode D2, a third diode D3, a first capacitor C1, a second capacitor C2 and a third capacitor C3. Specifically, the inductor L and the switch SW (e.g., N-type metal-oxide-semiconductor transistor) are connected in series between the supply voltage VDD and ground. The inductor L and (a first end of) the switch SW are interconnected at a first node N, and the switch SW (e.g., a gate of the N-type metal-oxide-semiconductor transistor) is controlled by the control signal GDRP (from the boost control circuit 125). The first diode D1 and the first capacitor C1 are connected in series between the first node N and the ground, where an anode of the first diode D1 is connected to the first node N, and one end of the first capacitor C1 is connected to the ground. The first diode D1 and (another end of) the first capacitor C1 are interconnected at a second node VGH, which provides the gate high voltage VGH. The second diode D2 and the third diode D3 are forward-biased connected between a third node VGL and the ground, where the third node VGL provides the gate low voltage VGL, an anode of the second diode D2 is connected to the third node VGL, and a cathode of the third diode D3 is connected to the ground. An interconnected node between the second diode D2 and the third diode D3 is connected to the first node N via the second capacitor C2. The third capacitor C3 is connected between the third node VGL and the ground.

In the operation of the boost converter 126 with respect to generating the gate high voltage VGH, when the switch SW is turned on, a current mainly flows from the inductor L to the switch SW, thereby storing energy in the inductor L. When the switch SW is turned off, a current mainly flows from the inductor L to the first capacitor C1, thereby reducing energy of the inductor L and providing the gate high voltage VGH at the second node VGH.

In the operation of the boost converter 126 with respect to generating the gate low voltage VGL, when the switch SW is turned off, a current mainly flows from the second capacitor C2 to the third diode D3, thereby storing energy in the second capacitor C2. When the switch SW is turned on, a current mainly flows from the third capacitor C3 to the second capacitor C2 via the second diode D2, thereby reducing energy of the second capacitor C2 and providing the gate low voltage VGL at the third node VGL.

The detect voltage RESE of the boost converter 126 may be derived from a second end of the switch SW such as a source voltage of the N-type metal-oxide-semiconductor transistor. The switch SW is turned off (by an inactive control signal GDR) when the selected reference voltage BG is not greater than the detect voltage RESE.

According to the adaptive power system 12 of the embodiment, as the selector 124 adaptively switches the selected reference voltage BG from the first reference voltage BG1 to the second reference voltage BG2 and switches the selected clock signal OSC from the first clock signal OSC1 to the second clock signal OSC2 when the supply voltage VDD is less than the predetermined threshold, the power voltages VGH/VGL will not suffer voltage drop or excessive peak current, and will not deviate to cause inaccurate color on the display device 11.

Although specific embodiments have been illustrated and described, it will be appreciated by those skilled in the art that various modifications may be made without departing from the scope of the present invention, which is intended to be limited solely by the appended claims.

What is claimed is:

1. An adaptive power system, comprising:
a multi-output reference voltage generator that generates multiple reference voltages;
a low-voltage detector that detects a supply voltage and accordingly generates a power detect signal representing relationship between the supply voltage and at least one predetermined threshold;
a selector that selects one of the multiple reference voltages according to the power detect signal, thereby outputting a selected reference voltage;
a boost control circuit that generates a control signal according to the selected reference voltage; and
a boost converter that generates power voltages according to the control signal.

2. The system of claim 1, wherein the multi-output reference voltage generator comprises a bandgap voltage reference circuit.

3. The system of claim 1, wherein the multi-output reference voltage generator comprises:
a buffer coupled to receive a base reference voltage and configured to generate a buffered voltage; and
a voltage divider coupled to the buffered voltage and configured to output the multiple reference voltages.

4. The system of claim 1, wherein the multi-output reference voltage generator comprises a dual-output reference voltage generator that generates a first reference voltage and a second reference voltage, which is greater than the first reference voltage.

5. The system of claim 1, further comprising:
a clock generator that generates multiple clock signals.

6. The system of claim 5, wherein the clock generator comprises:
a ring oscillator; and
a plurality of frequency dividers connected in series to an output of the ring oscillator, outputting multiple signals with different frequencies as the clock signals respectively.

7. The system of claim 5, wherein the selector further selects one of the multiple clock signals according to the power detect signal, thereby outputting a selected clock signal.

8. The system of claim 7, wherein the boost control circuit generates the control signal further according to the selected clock signal.

9. The system of claim 8, wherein the boost control circuit generates the control signal further according to a detect voltage derived from the boost converter.

10. The system of claim 9, wherein the boost control circuit comprises:
a first comparator that compares the selected reference voltage and the detect voltage, thereby generating an active first compare result when the selected reference voltage is greater than the detect voltage; and
a logic circuit that generates the control signal, which becomes active only if all the first compare result and the selected clock signal are active.

11. The system of claim 10, wherein the boost control circuit further comprises:
a second comparator that compares a predetermined fraction of one power voltage with a predetermined value, thereby generating an active second compare result when the predetermined fraction of the power voltage is less than the predetermined value.

12. The system of claim 11, wherein the logic circuit generates an active control signal only if all the first compare result, the second compare result and the selected clock signal are active.

13. The system of claim 9, wherein the boost converter comprises:
a switch controlled by the control signal; and
an inductor connected to a first end of the switch;
wherein the inductor and the switch are connected between the supply voltage and ground, and the detect voltage is derived from a second end of the switch.

14. The system of claim 13, wherein the switch comprises an N-type metal-oxide-semiconductor transistor with a drain connected to the inductor, a gate coupled to receive the control signal, and a source that provides the detect voltage.

15. The system of claim 1, wherein the low-voltage detector generates a low power detect (LPD) signal which becomes active when the supply voltage is greater than a predetermined threshold, otherwise the LPD signal becomes inactive when the supply voltage is not greater than the predetermined threshold.

16. The system of claim 1, wherein the low-voltage detector comprises:
a comparator that compares a predetermined faction of the supply voltage with a predetermined threshold, thereby generating an active low power detect (LPD) signal when the predetermined fraction of the supply voltage is greater than the predetermined threshold.

17. The system of claim 1, wherein the selector comprises:
a plurality of switches that outputs the selected reference voltage according to the power detect signal.

* * * * *